(12) United States Patent  
Ito et al.

(10) Patent No.: US 10,044,914 B2  
(45) Date of Patent: Aug. 7, 2018

(54) IMAGING SYSTEM, IMAGING DEVICE, INFORMATION PROCESSING DEVICE, METHOD, AND PROGRAM

(71) Applicant: Sony Corporation, Tokyo (JP)

(72) Inventors: Ryogo Ito, Tokyo (JP); Keiji Okamoto, Chiba (JP); Yoko Fukata, Tokyo (JP); Kazuma Akamatsu, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/306,551

(22) PCT Filed: May 1, 2015

(86) PCT No.: PCT/JP2015/063125  
§ 371 (c)(1),  
(2) Date: Oct. 25, 2016

(87) PCT Pub. No.: WO2015/194275  
PCT Pub. Date: Dec. 23, 2015

(65) Prior Publication Data  
US 2017/0171434 A1   Jun. 15, 2017

(30) Foreign Application Priority Data  
Jun. 17, 2014   (JP) ................. 2014-124488

(51) Int. Cl.  
*H04N 5/217* (2011.01)  
*H04N 5/225* (2006.01)  
*H04M 1/02* (2006.01)

(52) U.S. Cl.  
CPC .......... *H04N 5/217* (2013.01); *H04M 1/0264* (2013.01); *H04N 5/2253* (2013.01)

(58) Field of Classification Search  
CPC ...................................................... H04N 5/232  
(Continued)

(56) References Cited

U.S. PATENT DOCUMENTS 6,408,135 B1    6/2002  Imada  
6,975,351 B2 *  12/2005 Ikeda ................. H04N 5/23203  
                                                        348/211.14  
2012/0099830 A1  4/2012  Shibuno

FOREIGN PATENT DOCUMENTS

DE    20 2014 101 965 U1    7/2014  
EP         1 542 455 A2     6/2005  
(Continued)

OTHER PUBLICATIONS

Extended European Search Report dated Mar. 27, 2018 for corresponding European Application No. 15809852.5.

*Primary Examiner* — Joel Fosselman  
(74) *Attorney, Agent, or Firm* — Michael Best & Friedrich LLP

(57) ABSTRACT

An imaging system 10 includes a control unit 15. An imaging device 20 and an information processing device 60 include a fixed state in which the devices are fixed to each other, and a separated state in which the devices are separated from each other. The control unit 15 correlates disturbance information, which indicates disturbance affecting image data or audio data generated by the imaging device 20, with image data generated by the imaging device 20 at the time of disturbance on the basis of fixation/separation information indicating the fixed state or the separated state of the imaging device 20 and the information processing device 60. Accordingly, a low-quality portion in a captured image is easily detectable on the basis of disturbance information correlated with image data.

18 Claims, 12 Drawing Sheets

(A)

(B)

(58) Field of Classification Search
USPC .................................... 348/211.14, 211.99
See application file for complete search history.

(56) References Cited

FOREIGN PATENT DOCUMENTS

| | | |
|---|---|---|
| EP | 2 840 771 A2 | 2/2015 |
| JP | 06-205274 A | 7/1994 |
| JP | 2007-074276 A | 3/2007 |
| JP | 2008-178062 A | 7/2008 |
| JP | 2012-186698 A | 9/2012 |
| JP | 2013-160781 A | 8/2013 |

* cited by examiner

FIG. 2
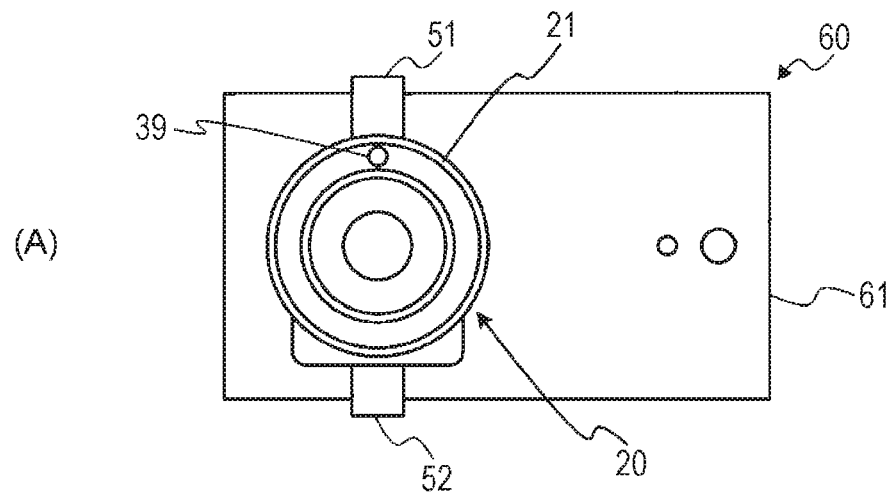
(A)
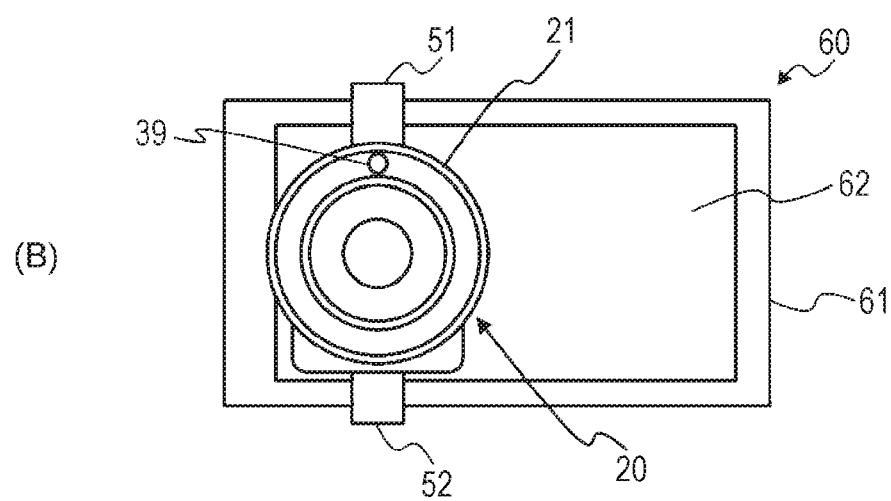
(B)

FIG. 4
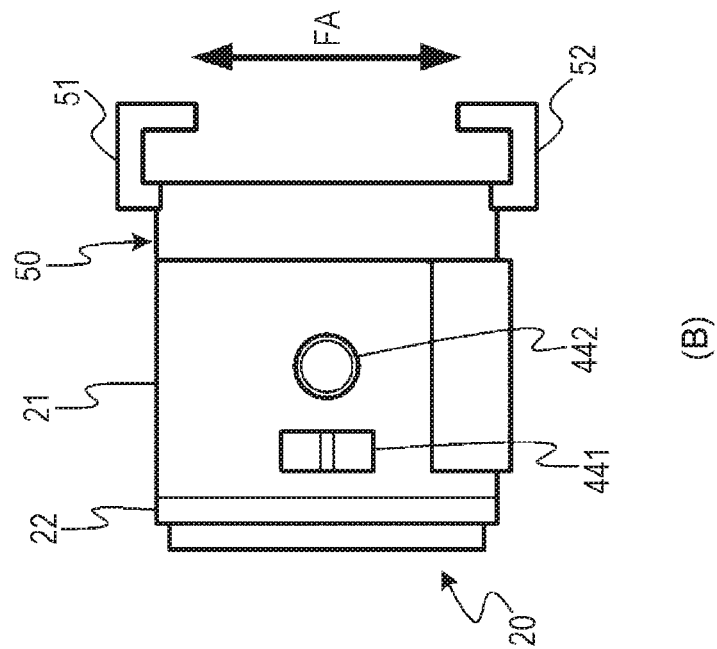
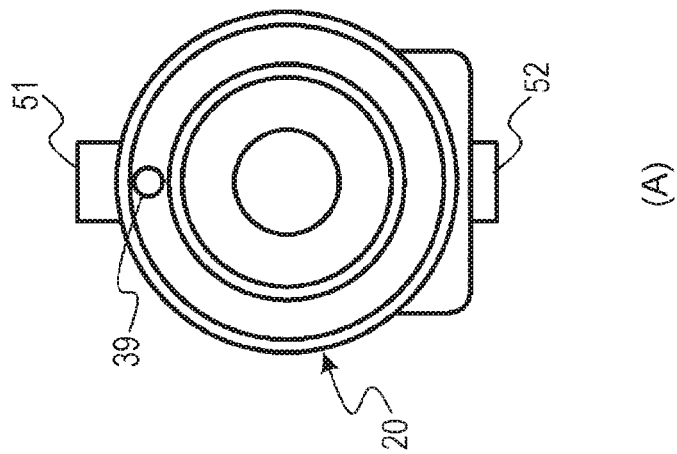

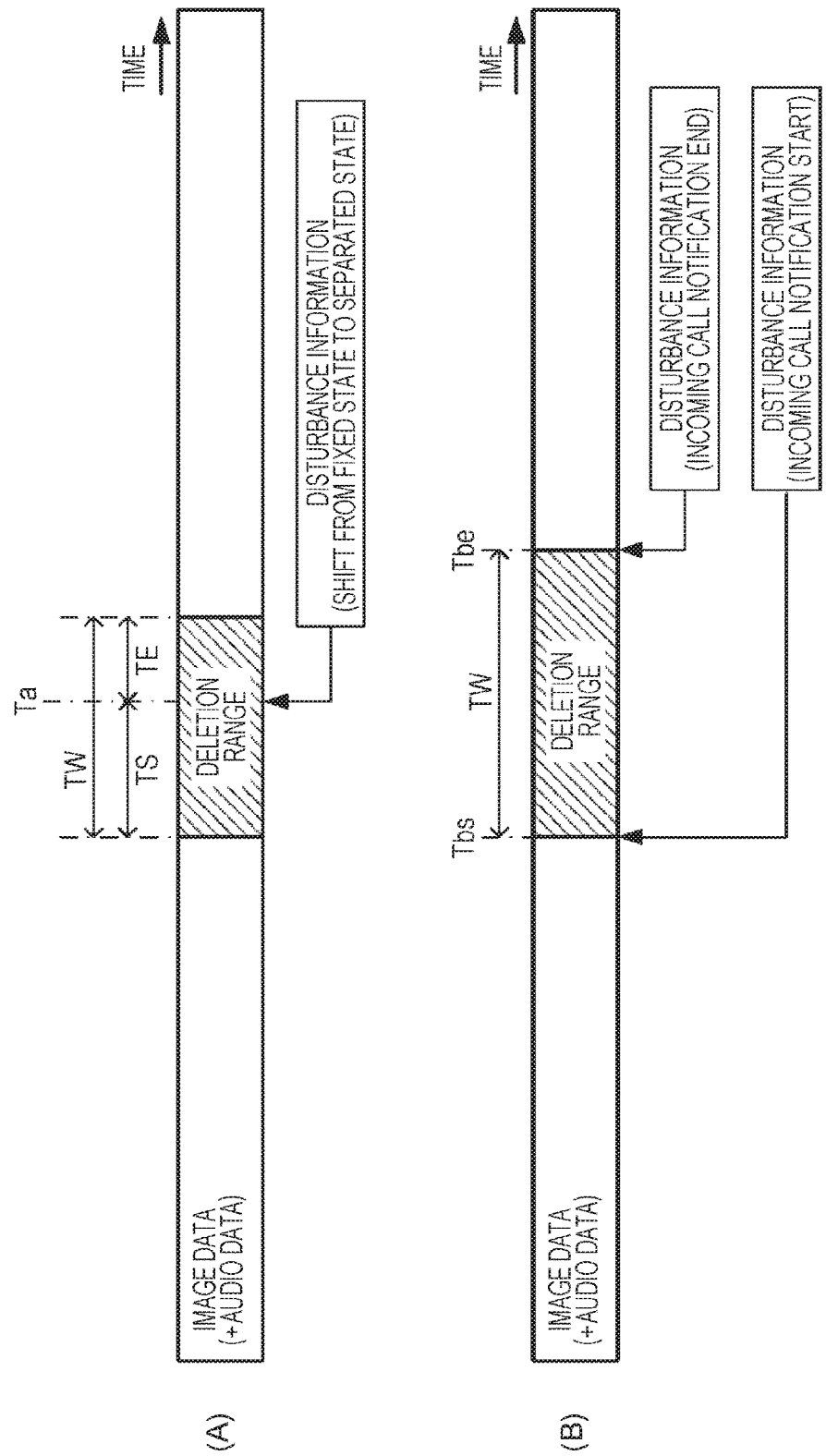

IMAGING SYSTEM, IMAGING DEVICE, INFORMATION PROCESSING DEVICE, METHOD, AND PROGRAM

TECHNICAL FIELD

This technology relates to an imaging system, an imaging device, an information processing device, a method, and a program, developed to easily detect a low-quality portion of a captured image.

BACKGROUND ART

It has become widespread to use an imaging device, such as a digital still camera and a digital video camera, which generates image data by imaging a subject, and records the generated image data as content. In addition, with a spread of an information processing device which exchanges various types of data via wireless communication (such as smartphone), it has been proposed to operate an imaging device by wireless remote control from a far position by using an information processing device (for example, see Patent Document 1).

CITATION LIST

Patent Document

Patent Document 1: Japanese Patent Publication Laid-Open No. 2012-186698

SUMMARY OF THE INVENTION

Problems to be Solved by the Invention

Incidentally, the imaging device is not necessarily located away from the information processing device, but may be fixed to the information processing device. In addition, there is a demand for development of automatic editing and other processing on the basis of automatic detection of a low-quality portion in a captured image.

Accordingly, an object of this technology is to provide an imaging system, an imaging device, an information processing device, a method, and a program, capable of easily detecting a low-quality portion in a captured image, even in case of the imaging device and the information processing device configured for use in a state of being fixed to each other as well as in a state of being separated from each other.

Solutions to Problems

A first aspect of this technology is directed to an imaging system including a fixed state in which an information processing device and an imaging device are fixed to each other, and a separated state in which the information processing device and the imaging device are separated from each other, the imaging system including a control unit that correlates disturbance information, which indicates disturbance affecting image data or audio data generated by the imaging device, with image data generated by the imaging device at the time of the disturbance on the basis of fixation/separation information indicating the fixed state or the separated state.

The imaging system of this technology is configured to use the information processing device and the imaging device in the fixed state in which the devices are fixed to each other, or in the separated state in which the devices are separated from each other. A fixation/separation determination unit determines the fixed state or the separated state, for example. The control unit provided on the information processing device or the imaging device, or the control unit provided separately from the information processing device and the imaging device correlates disturbance information, which indicates disturbance affecting the imaging device in the fixed state, with image data generated by the imaging device at the time of disturbance on the basis of a determination result determined by the fixation/separation determination unit. The disturbance information corresponds to information indicating a shift from the fixed state to the separated state, or a shift from the separated state to the fixed state as disturbance, information indicating notification given to a user from the information processing device as disturbance, and information indicating an interruption of a communication line in the information processing device as disturbance, and includes information indicating a type of disturbance. The notification given to the user includes notification concerning a cellular phone function, for example. In addition, when the control unit is provided on the imaging device, the imaging device is notified about disturbance occurring in the information processing device.

A second aspect of this technology is directed to an imaging control method that includes a fixed state in which an information processing device and an imaging device are fixed to each other, and a separated state in which the information processing device and the imaging device are separated from each other, the method including a step of correlating disturbance information, which indicates disturbance affecting image data or audio data generated by the imaging device, with image data generated by the imaging device at the time of the disturbance on the basis of fixation/separation information indicating the fixed state or the separated state.

A third aspect of this technology is directed to a program for causing a computer to execute control for an information processing device or an imaging device including a fixed state in which the information processing device and the imaging device are fixed to each other, and a separated state in which the information processing device and the imaging device are separated from each other, the program for causing the computer to execute a procedure that correlates disturbance information, which indicates disturbance affecting image data or audio data generated by the imaging device, with image data generated by the imaging device at the time of the disturbance on the basis of fixation/separation information indicating the fixed state or the separated state.

Note that the program according to the present technology is a program allowed to be presented to a general-purpose computer capable of executing various program codes in computer-readable forms of storage media or communication media, such as storage media including an optical disk, a magnetic disk, and a semiconductor memory, and communication media including a network. Processes corresponding to the program are realized by a computer under the program presented to the computer in the computer-readable forms.

A fourth aspect of this technology is directed to an imaging device including a fixed state of being fixed to an information processing device, and a separated state of being separated from the information processing device, the imaging device including a control unit that correlates disturbance information, which indicates disturbance affecting image data or audio data generated by the imaging device, with image data generated by the imaging device at the time of the disturbance on the basis of fixation/separation information indicating the fixed state or the separated state.

A fifth aspect of this technology is directed to an information processing device including a fixed state of being fixed to an imaging device, and a separated state of being separated from the imaging device, the information processing device including a control unit that correlates disturbance information, which indicates disturbance affecting image data or audio data generated by the imaging device, with image data generated by the imaging device at the time of the disturbance on the basis of fixation/separation information indicating the fixed state or the separated state.

Effects of the Invention

According to this technology, there are provided a fixed state in which an information processing device and an imaging device are fixed to each other, and a separated state in which the information processing device and the imaging device are separated from each other. Disturbance information, which indicates disturbance affecting image data or audio data generated by the imaging device, is correlated with image data generated by the imaging device at the time of the disturbance on the basis of fixation/separation information indicating the fixed state or the separated state. Accordingly, a low-quality portion in a captured image is easily detectable in a system configured for use in a fixed state of an imaging device and an information processing device fixed to each other, as well as in a state of being separated from each other. Note that advantageous effects described in this specification are presented only by way of example, wherefore other advantageous effects or additional advantageous effects may be offered.

BRIEF DESCRIPTION OF DRAWINGS

FIG. 2 is a view illustrating an example of an external appearance configuration of the imaging system.
FIG. 4 illustrates a front view and a side view of an imaging device.
FIG. 12 illustrates examples of deletion of image data and audio data.

MODE FOR CARRYING OUT THE INVENTION

Figure 1:
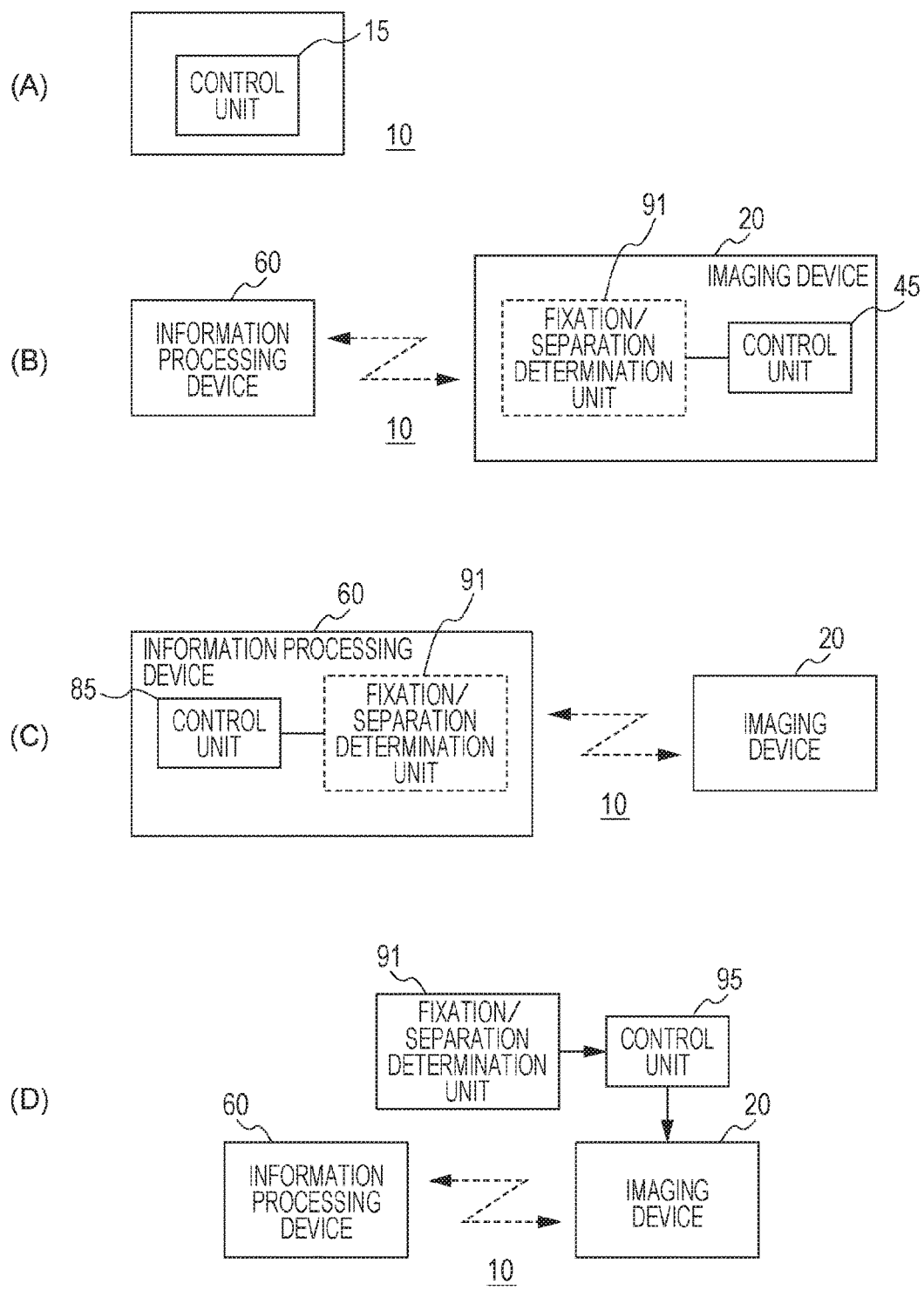
FIG. 1 is a view illustrating a function configuration of an imaging system.

A mode for carrying out the present technology is hereinafter described. Note that the description is presented in the following order.
1. Function configuration of imaging system
2. External appearance of imaging system
3. Function configuration of imaging device
4. Function configuration of information processing device
5. Operations of imaging system
5-1. Link between imaging device and information processing device
5-2. Determination of fixed/separated state of imaging device and information processing device
5-3. Basic operation of imaging system
5-4. First operation of imaging system
5-5. Second operation of imaging system
5-6. Third operation o imaging system
5-7. Other operations of imaging system
6. Use of disturbance information <1. Function Configuration of Imaging System>

FIG. 1 illustrates an example of a function configuration of an imaging system according to the present technology. The imaging system 10 has a fixed state in which an information processing device and an imaging device are fixed to each other, and a separated state in which the information processing device and the imaging device are separated from each other. As illustrated in (A) of FIG. 1, the imaging system 10 includes a control unit 15. The control unit 15 has a function of correlating disturbance information, which indicates disturbance affecting image data or audio data generated by the imaging device, with image data generated by the imaging device at the time of disturbance on the basis of fixation/separation information indicating the fixed state or the separated state.

The control unit 15 of the imaging system 10 may be provided either on the imaging device, or on the information processing device. Alternatively, the control unit may be provided on an adaptor fixing the imaging device and the information processing device. For example, according to the imaging system 10 illustrated in (B) of FIG. 1 by way of example, a control unit 45 of an imaging device 20 has a function of correlating disturbance information with image data generated by the imaging device 20 at the time of disturbance. On the other hand, according to the imaging system 10 illustrated in (C) of FIG. 1 by way of example, a control unit 85 of an information processing device 60 has a function of correlating disturbance information with image data generated by the imaging device 20 at the time of disturbance on the basis of fixation/separation information indicating the fixed state or the separated state. According to the imaging system 10 illustrated in (D) of FIG. 1 by way of example, however, a control unit 95 provided independently from the imaging device 20 and the information processing device 60, has a function of correlating disturbance information with image data generated by the imaging device 20 at the time of disturbance.

The imaging system may further include a fixation/separation determination unit which outputs fixation/separation information indicating the fixed state or the separated state of the imaging device and the information processing device. For example, a fixation/separation determination unit 91 may be provided on the imaging device 20 as illustrated in (B) of FIG. 1, or on the information processing device 60 as illustrated in (C) of FIG. 1. Alternatively, the fixation/separation determination unit 91 may be provided independently from the imaging device 20 and the information processing device 60 as illustrated in (D) of FIG. 1. For example, the fixation/separation determination unit 91 may be provided on an adaptor or the dike fixing the imaging device and the information processing device. In addition, the fixation/separation determination unit 91 may be provided on the device different from the device including the control unit having the function of correlating disturbance information with image data generated by the imaging device 20 at the time of disturbance. For example, when the control unit 45 of the imaging device 20 has the function of correlating disturbance information with image data generated by an imaging device 20 at the time of disturbance as in the case of the imaging system 10 illustrated in (B) of FIG. 1, the fixation/separation determination unit 91 may be provided on the information processing device 60.

The imaging device 20 forms captured images (still images and dynamic images). The imaging device 20 further has a wireless communication function for communication of various information with the information processing device 60. In addition, the imaging device 20 does not have a function for displaying captured images formed by imaging, or a function for outputting voices during imaging. Captured images and voices are displayed and output by the information processing device to which image data and audio data during imaging are transmitted. Note that the imaging device 20 may have a function for displaying captured images or a function for outputting voices during imaging.

The information processing device 60 is a device having a display function and a wireless communication function. For example, the information processing device 60 may be constituted by a cellular phone, a smartphone, a tablet-type terminal, or a note-type personal computer. The information processing device 60 processes information supplied from the imaging device 20 via wireless communication. For example, the information processing device 60 displays captured images and outputs voices on the basis of image data and audio data supplied from the imaging device 20.

Note that the configuration of the imaging system 10 is not limited to the configuration illustrated in FIG. 1. For example, the imaging system 10 may be constituted by the control unit 15 only, the control unit 45 only, the imaging device 20 only, the information processing device 60 only, or a combination of these units and devices.

<2. External Appearance of Imaging System>

Figure 3:
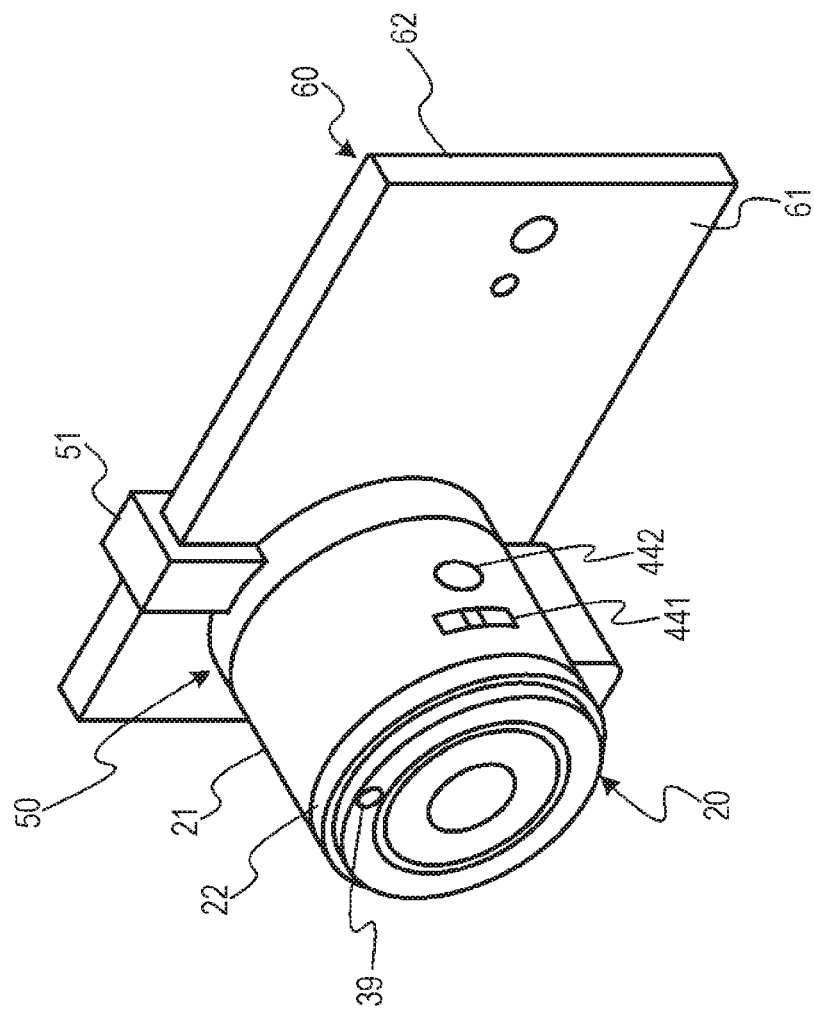
FIG. 3 is a perspective view illustrating an example of the external appearance configuration of the imaging system.

FIG. 2 is view illustrating an example of an external configuration of the imaging system, while FIG. 3 is a perspective view illustrating an example of an external configuration of the imaging system. FIG. 4 illustrates a front view and a side view of the imaging device. Note that the information processing device illustrated in FIG. 2 and FIG. 3 by way of example is constituted by a smartphone.

While not illustrated in the figures, the imaging device 20 includes an imaging optical system, an imaging unit, a signal processing unit, a communication unit, a control unit, and others inside an outer cylindrical unit 21 having a cylindrical shape. An annular control ring 22 is provided at a front end portion of the outer cylindrical unit 21. The imaging device 20 changes a focus position and a zoom position in accordance with rotation of the control ring 22. Accordingly, manual operation such as focus adjustment is performable by using the control ring 22. Moreover, a zoom button 441 and a shutter button 442 are provided on a side surface of the outer cylindrical unit 21. The imaging device 20 changes the zoom position to a wide-angle end or a telephoto end in accordance with operation of the zoom button 441. The imaging device 20 in a still image mode further performs a process for recording a still image in a recording medium, as an image captured at the time of operation of the shutter button 442 by a user. The imaging device 20 in a dynamic image mode further starts or ends recording of a dynamic image in accordance with operation of the shutter button 442. The imaging device 20 further includes an audio input unit 39.

While not shown in the figures, the information processing device 60 includes a signal processing unit, a communication unit, a control unit, and others inside an outer housing 61 having a substantially rectangular case-like shape. A display panel 62 is further provided on one surface (front surface) of the outer housing 61. The display panel 62 is constituted by a touch panel. Respective functions are performed on the basis of operation of corresponding predetermined positions on the display panel 62.

The imaging device 20 is equipped with an attachment mechanism unit 50 which connects the imaging device 20 and the information processing device 60 into one piece body. Attachment members 51 and 52 provided on the attachment mechanism unit 50 are configured to be movable in a direction of an arrow FA illustrated in FIG. 4. The user moves the attachment members 51 and 52 in the direction of the arrow FA in accordance with the shape, the size and the like of the information processing device 60, and fits the attachment members 51 and 52 to the outer housing 61 of the information processing device 60 to fix the imaging device 20 to the information processing device 60 into one piece body. Note that (A) of FIG. 2 illustrates a state that the imaging device 20 is fixed to the rear surface side of the information processing device 60 into one piece body, and that (B) of FIG. 2 illustrates a state that the imaging device 20 is fixed to the front surface side (display panel 62 side) of the information processing device 60 into one piece body. The user also moves the attachment members 51 and 52 fitted to the outer housing 61 of the information processing device 60 in a direction opposite to the fitting direction to separate the imaging device 20 and the information processing device 60 from each other.

Note that the attachment mechanism unit 50 is not required to be a component combined with the imaging device 20 as one piece body, but may be an adaptor provided separately from the imaging device 20 for connecting the imaging device 20 and the information processing device 60 into one piece body.

<3. Function Configuration of Imaging Device>

Figure 5:
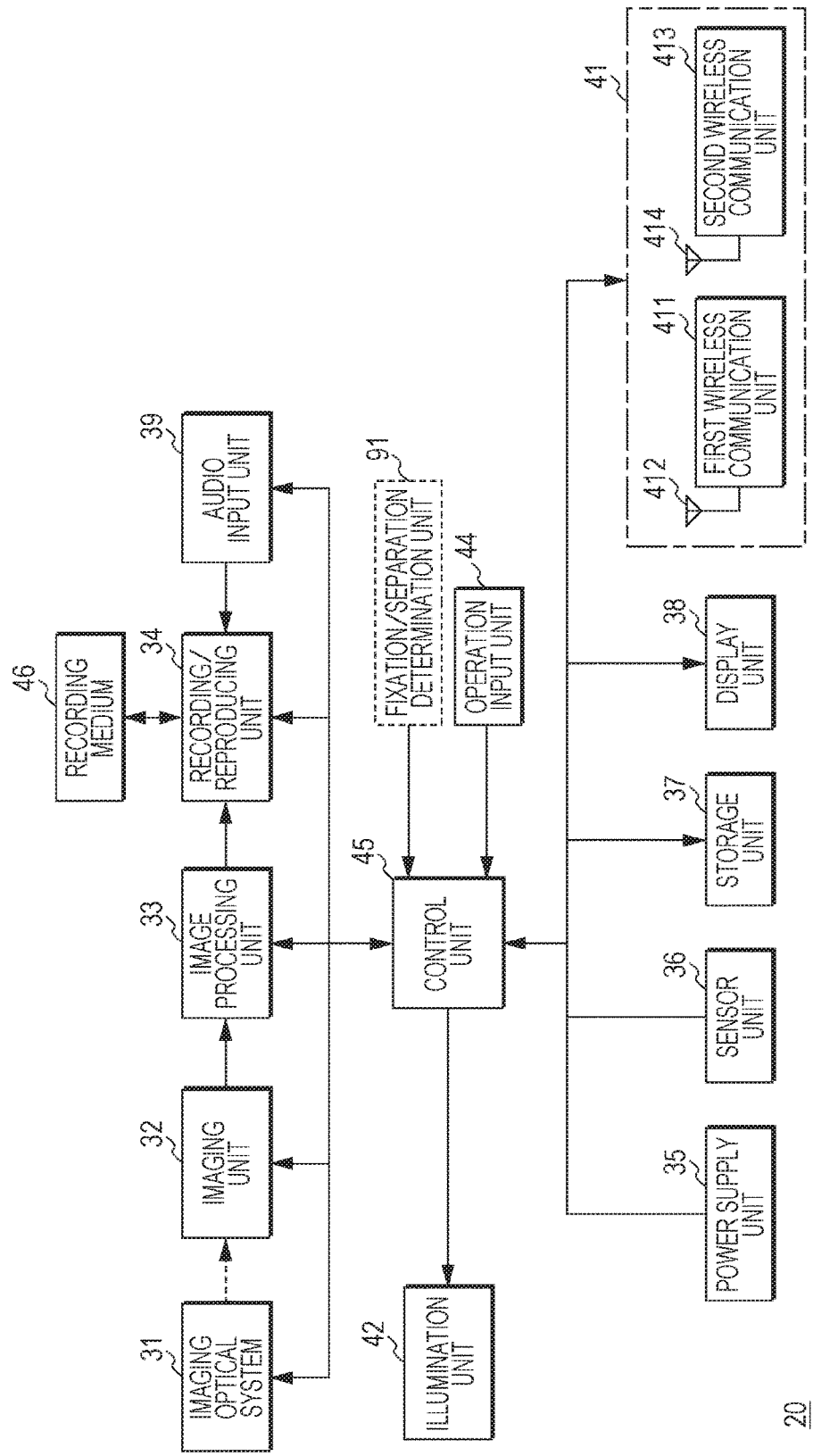
FIG. 5 is a block diagram illustrating as example of a function configuration of the imaging device.

A function configuration of the imaging device is now described. FIG. 5 is a block diagram illustrating an example of the function configuration of the imaging device.

The imaging device 20 includes an imaging optical system 31, an imaging unit 32, an image processing unit 33, a recording/reproducing unit 34, a power supply unit 35, a sensor unit 36, a storage unit 37, a display unit 38, an audio input unit 39, a communication unit 41, an illumination unit 42, an operation input unit 44, and a control unit 45. The imaging device 20 is further equipped with a recording medium 46. The recording medium 46 may be fixed to the imaging device 20, or may be provided as a detachably attached component.

The imaging optical system 31 includes a lens group constituted by a focus lens, a zoom lens and the like, a diaphragm adjustment mechanism, and a driving unit which drives the lens group and the diaphragm adjustment mechanism. The imaging optical system 31 may further include a shutter mechanism, an image stabilizing mechanism, and others.

The imaging unit 32 is constituted by an imaging device such as a charge coupled device (CCD) and a complementary metal oxide semiconductor (CMOS). The imaging unit 32 converts a subject optical image formed by the imaging optical system 31 into image data. The imaging unit 32 outputs the image data generated by photoelectric conversion to the image processing unit 33.

The image processing unit 33 performs various types of signal processing and the like for the image data output from the imaging unit 32. For example, the image processing unit 33 performs noise removal, tone correction, edge detection and the like as necessary. The image processing unit 33 outputs the processed image data to the recording/reproducing unit 34.

The recording/reproducing unit 34 records captured images, and reproduces recorded captured images while using the recording medium 46 for recording and reading. The recording/reproducing unit 34 receives image data showing still images and dynamic images as data generated by the imaging unit 32 and processed by the image processing unit 33, and records the image data in the recording medium 46. The recording/reproducing unit 34 also read) image data recorded in the recording medium 46 to reproduces still images and dynamic images. Note that the recording/reproducing unit 34 may record image data in the recording medium 46 prior to processing by the image processing unit 33. The recording/reproducing unit 34 may further perform an encoding process for compressing a data volume of image data recorded in the recording medium 46, and a decoding process for decoding encoded data recorded in the recording medium 46.

The power supply unit 35 is constituted by a buttery and a power supply circuit. The power supply unit 35 supplies power to respective units of the imaging device 20 in accordance with control signals output from the control unit 45.

The sensor unit 36 detects a current position, a posture and a posture change, an orientation, and others of the imaging device 20. The sensor unit 36 is constituted by a sensor for detecting the current position, a sensor for detecting the posture and posture change, and a sensor for detecting the orientation such as an imaging direction, and outputs sensor information indicating a detection result to the control unit 45. For example, the sensor unit 36 detects postures such as inclination of the imaging device 20 with respect to the vertical direction and the horizontal direction, and a position of the imaging device 20 in a rotational direction with respect to a rotation axis corresponding to an optical axis of the imaging optical system 31. The sensor unit 36 further detects a posture change and the like of the imaging device 20. Furthermore, when the sensor information is also output to the information processing device 60 together with image data on captured images, captured images are displayed on the information processing device 60 in consideration of the posture and the like of the imaging device 20. When captured images are formed by the imaging device 20 inclined to the horizontal direction, for example, the information processing device 60 displays images while correcting inclination of the imaging device 20 on the basis of the sensor information. This manner of image display prevents inclined display of a subject which is not actually inclined to the horizontal direction. Note that the sensor unit 36 includes a global positioning system (GPS) positional measurement module as a sensor for detecting the current position, for example. The sensor unit 36 further includes a three-axis acceleration sensor, an inclination sensor, a gyro sensor or the like, for example, as a sensor for detecting the posture and posture change, and a geomagnetic sensor or the like, for example, as a sensor for detecting the orientation of the imaging direction. In addition, the sensor unit 36 may be configured to detect at least any one of the current position, the posture and posture change, the orientation, and other conditions of the imaging device 20.

The storage unit 37 is a recording medium such as a random access memory (RAM) and a read only memory (ROM). The RAM is used as a work area for the control unit 45, for example. On the other hand, the ROM stores programs and the like under which the control unit 45 performs various controls, for example. In addition, the ROM and the RAM store control information and the like utilized when the control unit 45 performs various controls.

The display unit 38 constituted by a liquid crystal display element or the like displays a setting state and an operation state of the imaging device 20.

The audio input unit 39 is constituted by a microphone. The audio input unit 42 makes signal level adjustment of audio signals generated by the microphone, and performs an A/D conversion process for converting audio signals into audio data, and a process for compressing a data volume, for example, and outputs processed audio data to the recording/reproducing unit 34.

The communication unit 41 includes a first wireless communication unit 411, a first antenna 412, a second wireless communication unit 413, and a second antenna 414.

The first wireless communication unit 411 has a near field communication (NFC) function. The first wireless communication unit 411 transmits wireless signals reaching a range approximately from 3 cm to 10 cm, or a short distance of approximately 7 mm depending on design, from the first antenna 412 under control by the control unit 45 to perform NFC communication with an external device contained in a radio wave reaching range (such as information processing device 60). The first wireless communication unit 411 transmits connection information (Wi-Fi configuration) for Wi-Fi automatic connection, or an android application record (AAR), for example, in response to a check command received from the external device. The connection information includes a service set identifier (SSID), a PassKey (encryption key) and the like for Wi-Fi connection.

The second wireless communication unit 413 has a wireless LAN communication function. The second wireless communication unit 413 transmits wireless signals in conformity to communication standards of IEEE 802.11 series via the second antenna 414 under control by the control unit 45 to communicate with an external device (such as information processing device 60). The second wireless communication unit 413 executes Wi-Fi authentication in response to a Wi-Fi connection request transmitted from the external device, for example, and performs a process for establishing a Wi-Fi communication connection with the external device, for example.

The illumination unit 42 emits illumination light toward a subject on the basis of a control signal transmitted from the control unit 45 to capture an image having desired brightness.

The operation input unit 44 detects operations input from the user, and outputs operation signals corresponding to the user operations to the control unit 45. The operation input unit 44 includes the zoom button 441 and the shutter button 442 described above, and is so configured that respective functions have been allocated to physical switches beforehand.

The control unit 45 executes programs recorded in the storage unit 37 to generate control signals on the basis of operation signals supplied from the operation input unit 44, control information stored in the storage unit 37, results of communication with the information processing device 60, fixation/separation information, sensor information and the like. The control unit 45 outputs the generated control signals to respective units to perform imaging control, image processing control, recording/reproduction control, and other controls which allow the imaging device 20 to execute operations corresponding to user operations. The control unit 45 further performs a process for transmitting image data and audio data from the communication unit 41 to the information processing device 60, and a process for controlling operations of the imaging device 20 on the basis of control signals received from the information processing device 60.

The recording medium 46 is a unit detachably attached, and constituted by a memory card or the like to which captured images and the like are written.

Note that fixation/separation information output from the fixation/separation determination unit 91 is further output to the control unit 85 of the information processing device 60 via the control unit 45 or the communication unit 41 when the fixation/separation determination unit 91 is provided on the imaging device 20. In addition, processing by the fixation/separation determination unit 91 may be performed by the control unit 45.

<4. Function Configuration of Information Processing Device>

Figure 6:
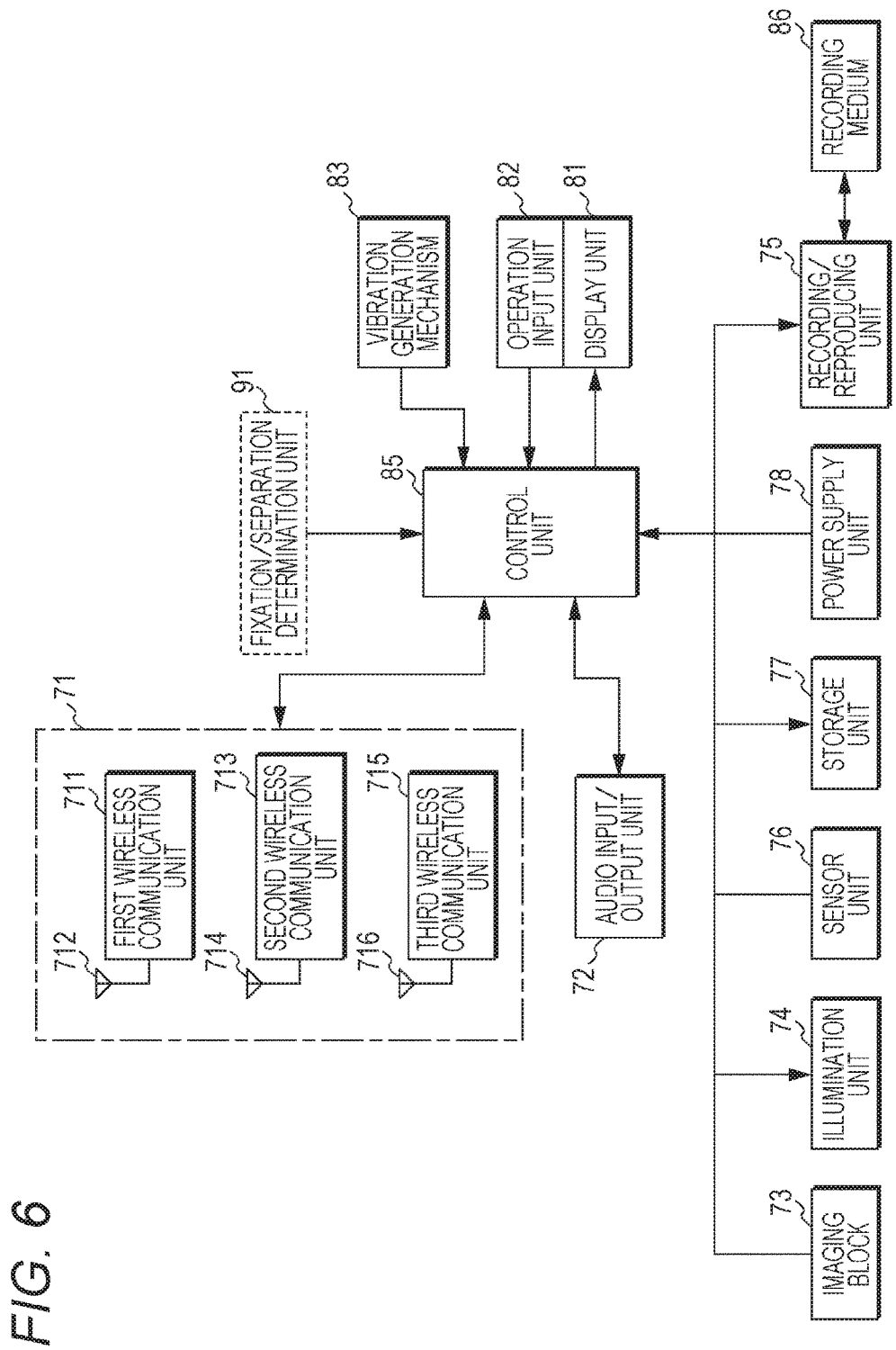
FIG. 6 is a block diagram illustrating an example of a function configuration of an information processing device (e.g., smartphone).

A function configuration of the information processing device is now described. FIG. 6 is a block diagram illustrating an example of the function configuration of the information processing device (such as smartphone).

The information processing device 60 includes a communication unit 71, an audio input/output unit 72, an imaging block 73, an illumination unit 74, a recording/reproducing unit 75, a sensor unit 76, a storage unit 77, a power supply unit 78, a display unit 81, an operation input unit 82, a vibration generation mechanism 83, and the control unit 85. The information processing device 60 is further provided with a recording medium 86 detachably attached to the information processing device 60.

The communication unit 71 includes a first wireless communication unit 711, a first antenna 712, a second wireless communication unit 713, a second antenna 714, a third wireless communication unit 715, and a third antenna 716.

The first wireless communication unit 711 has a near field communication (NFC) function. The first wireless communication unit 711 transmits radio waves via the first antenna 712 under control by the control unit 85 to perform NFC communication with an external device (such as imaging device 20). The second wireless communication unit 713 has a wireless LAN communication function. The second wireless communication unit 713 transmits wireless signals in conformity to communication standards of IEEE 802.11 series via the second antenna 714 under control by the control unit 85 to communicate with the external device (such as imaging device 20). The third wireless communication unit 715 has cellular phone functions, such as a telephone call function and an electronic mail function. The third wireless communication unit 715 transmits wireless signals in conformity to communication standards such as long term evolution (LTE) via the third antenna 716 under control by the control unit 85 to communicate with base stations.

The audio input/output unit 72 is constituted by a speaker and a microphone. The audio input/output unit 72 inputs and outputs voice telephone calls via the communication unit 71. The audio input/output unit 72 further outputs voices on the basis of audio data output from the imaging device 20 via the communication unit 71. The audio input/output unit 72 further outputs reproduction sounds of music content and video content recorded in the storage unit 77 and the recording medium 86.

The imaging block 73 is constituted by an imaging optical system, an imaging device such as a charge coupled device (CCD), and a complementary metal oxide semiconductor (CMOS), a driving unit for driving the imaging optical system and the imaging device, and others. The imaging block 73 generates image data showing captured images.

The illumination unit 74 emits illumination light toward a subject on the basis of control signals received from the control unit 85 to capture images having desired brightness.

The recording/reproducing unit 75 records various types of information, and reads recorded information while using the recording medium 86. The recording/reproducing unit 75 records music content and video content, captured images, mail information, address information associated with other persons and used for wireless communication, and others in the recording medium 86. The recording/reproducing unit 75 further reads various types of information recorded in the recording medium 86.

The sensor unit 76 detects a current position, a posture and a posture change, an orientation, and others of the information processing device 60. The sensor unit 76 is constituted by a sensor for detecting the current position, a sensor for detecting the posture and posture change, and a sensor for detecting the orientation such as an imaging direction, and outputs sensor information indicating a detection result to the control unit 85. Note that the sensor unit 76 includes a global positioning system (GPS) positional measurement module as a sensor for detecting the current position, for example. The sensor unit 76 further includes a three-axis acceleration sensor, an inclination sensor, a gyro sensor, or the like, for example as a sensor for detecting the posture and posture change, and a geomagnetic sensor or the like, for example, as a sensor for detecting the orientation of the imaging direction. In addition, the sensor unit 76 may be configured to detect at least any one of the current position, the posture and posture change, the orientation and other conditions of the information processing device 60.

The storage unit 77 is a recording medium such as a random access memory (RAM) and a read only memory (ROM). The RAM is used as a work area for the control unit 85, for example. On the other hand, the ROM stores programs and the like under which the control unit 85 performs various controls, for example. In addition, the ROM and the RAM store control information and the like utilized when the control unit 85 performs various controls. Moreover, the RAM is capable of recording music content, video content, programs of various types of applications, captured images supplied from the imaging device 20, mail information, and others.

The power supply unit 78 is constituted by a buttery and a power supply circuit. The power supply unit 78 supplies power to respective units of the information processing device 60 on the basis of control signals output from the control unit 85.

The display unit 81 is constituted by a display element such as a liquid crystal display and an organic EL display. The display unit 81 displays a graphical user interface (GUI) screen, characters and images corresponding to an operation of an application, and others under control by the control unit 85. The display unit 81 further displays images on the basis of image data output from the imaging device 20 under control by the control unit 85.

The operation input unit 82 is constituted by operation switches and a touch panel. The touch panel is provided on a display screen of the display unit 81, and so configured that functions are allocated in correspondence with display of the display screen. The operation input unit 82 generates operation signals corresponding to user operations, and outputs the generated operation signals to the control unit 85. Note that the display panel 62 described above is constituted by the display unit 81 and the operation input unit 82, for example.

The vibration generation mechanism 83 is a mechanism for performing a vibrator function vibrating the information processing device itself. The vibration generation mechanism 83 performs the vibrator function on the basis of a control signal received from the control unit 85 at the time of reception of an incoming call a state of use of the cellular phone function to notify the user about the incoming call through vibrations of the information processing device 60.

The control unit 85 executes programs recorded in the storage unit 77 to generate control signals on the basis of operation signals supplied from the operation input unit 82, control information stored in the storage unit 77, and others. The control unit 85 outputs the generated control signals to respective units to perform communication control, display control, recording/reproduction control and others allowing the information processing device 60 to perform operations corresponding to user operations. The control unit 85 further controls the communication unit 71 to allow wireless communication with the imaging device 20 and base stations. The control unit 85 further performs a process for starting a predetermined application program on the basis of communication with the imaging device 20, and a process for generating control signals on the basis of operation signals, fixation/separation information, and others, and transmitting the generated control signals to the imaging device 20 after a program start. The control unit 85 further performs a process for displaying captured images supplied from the imaging device 20 on the display unit 81, and other processes.

When the fixation/separation determination unit 91 is provided on the information processing device 60, fixation/separation information output from the fixation/separation determination unit 91 is output to the control unit 45 of the imaging device 20 via the control unit 85 or the communication unit 71. In addition, processing performed by the fixation/separation determination unit 91 may be performed by the control unit 85.

In addition, when the fixation/separation determination unit 91 is provided on an adaptor for fixing the imaging device 20 and the information processing device 60, the fixation/separation determination unit 91 outputs a determination result to the control unit 45 of the imaging device 20, or the control unit 85 of the information processing device 60.

<5. Operations of Imaging System>
<5-1. Link between Imaging Device and Information Processing Device>

Figure 7:
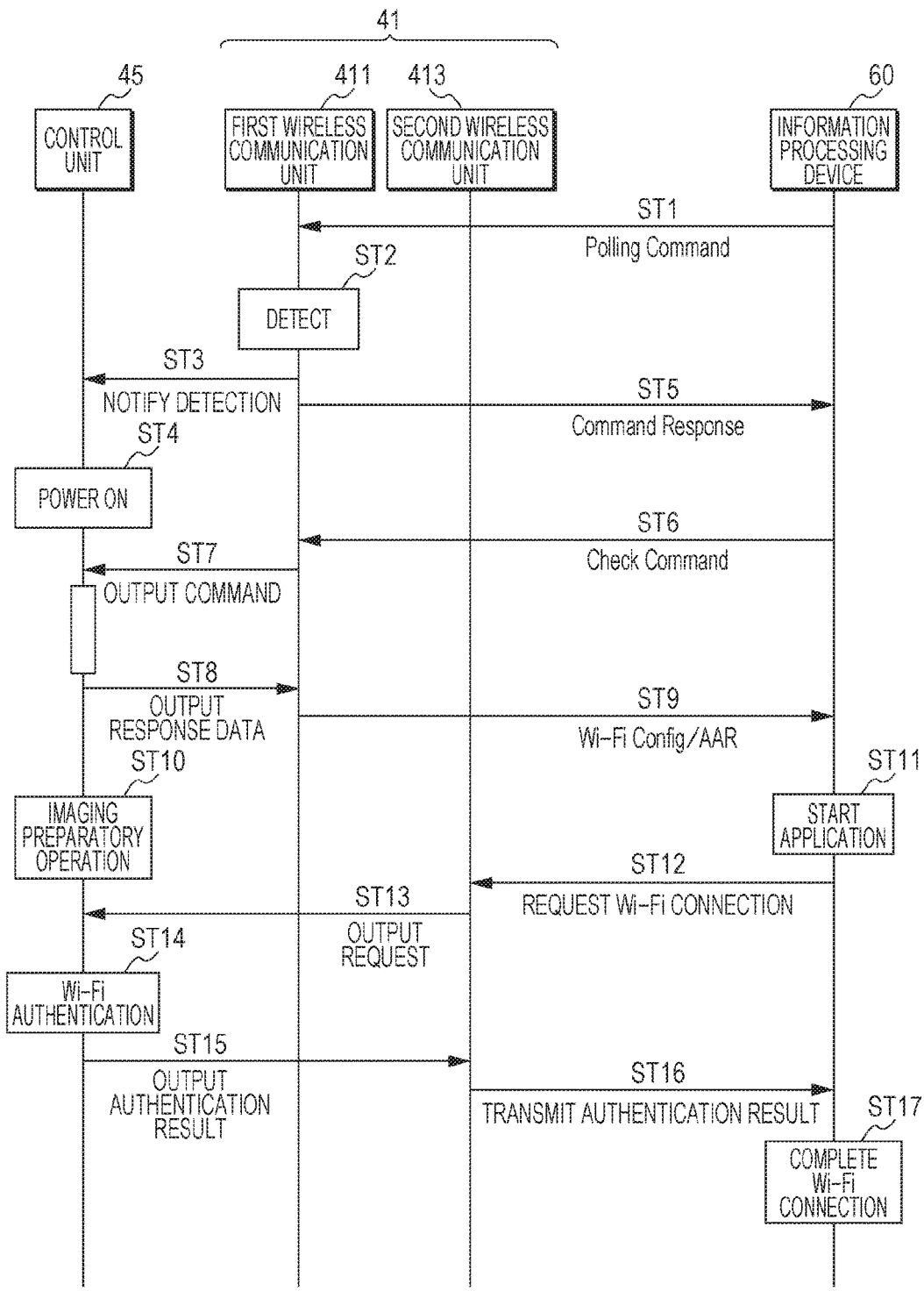
FIG. 7 is a sequence diagram illustrating operation processes performed until a start of a link function between the imaging device and the information processing device.

Operations of the imaging system are now described. FIG. 7 is a sequence diagram showing an operation process performed in the imaging system until a start of a link function between the imaging device ant the information processing device.

In step ST1, the information processing device 60 issues a polling command via NFC communication. When the first antenna of the imaging device 20 lies within a predetermined radio wave reaching range from the first antenna of the information processing device 60, the first wireless communication unit 411 of the communication unit 41 of the imaging device 20 detects the issue of the polling command in step ST2.

In step ST3, the first wireless communication unit 411 notifies the control unit 45 about detection of NFC communication from the information processing device 60 in response to this detection.

In step ST4, the control unit 45 generates a control signal in response to the detection notification received from the first wireless communication unit 411, and outputs the generated control signal to the power supply unit 35 to turn on power.

In step ST5, the first wireless communication unit 411 issues a command response via NFC communication in response to the detection of NFC communication.

In step ST6, the information processing device 60 finds an NFC communication partner by detecting the command response transmitted from the imaging device 20, and issues a check command to acquire predetermined information.

In step ST7, the first wireless communication unit 411 of the imaging device 20 outputs the check command received via NFC communication to the control unit 45.

In step ST8, the control unit 45 outputs response data to the first wireless communication unit 411 in response to the check command. The response data in this step contains Wi-Fi configuration and AAR described above, for example.

In step ST9, the first wireless communication unit 411 transmits the response data to the information processing device 60 via NEC communication. Note that the response data may be divided into a plurality of parts and transmitted for each part by repeating foregoing steps ST6 through ST9 a plurality of times.

In step ST10, the control unit 45 performs an imaging preparatory operation. The control unit 45 performs the preparatory operation to allow the imaging device 20 to come into an imaging state. The preparatory operation may further include a preparatory operation for producing a state on the basis of which the imaging state of the imaging device 20 is recognizable. For example, the control unit 45 may perform operations such as extraction of a lens and emission of start sound when the imaging optical system 31 is constituted by a retractable lens. Note that the imaging preparatory operation may be performed after completion of wireless LAN connection.

In step ST11, the information processing device 60 starts a predetermined application in correspondence with the received AAR. For example, processes executed in the predetermined application include a process for receiving image data on captured images transmitted from the imaging device 20 via wireless LAN communication, and displaying the captured images.

In step ST12, the information processing device 60 requests the imaging device 20 to make Wi-Fi connection on the basis of the received Wi-Fi configuration.

In step ST13, the second wireless communication unit 413 of the communication unit 41 of the imaging device 20 outputs the connection request received from the information processing device 60 to the control unit 45.

In step ST14, the control unit 45 executes authentication. Note that authentication may be executed by the second wireless communication unit 413.

In step ST15, the control unit 45 outputs an authentication result to the second wireless communication unit 413.

In step ST16, the second wireless communication unit 413 transmits the authentication result to the information processing device 60. In step ST17, the information processing device 60 completes wireless LAN connection on the basis of a success of authentication. Thereafter, the imaging device 20 and the information processing device 60 start wireless LAN communication.

Note that the order of processes performed until a start of the link function between the imaging device and the information processing device is not limited to the order shown in FIG. 7, but may be other orders as long as link between the imaging device 20 and the information processing device 60 is established via wireless LAN communication or the like.

[5-2. Determination of Fixed/Separated State of Imaging Device and Information Processing Device]

Figure 8:
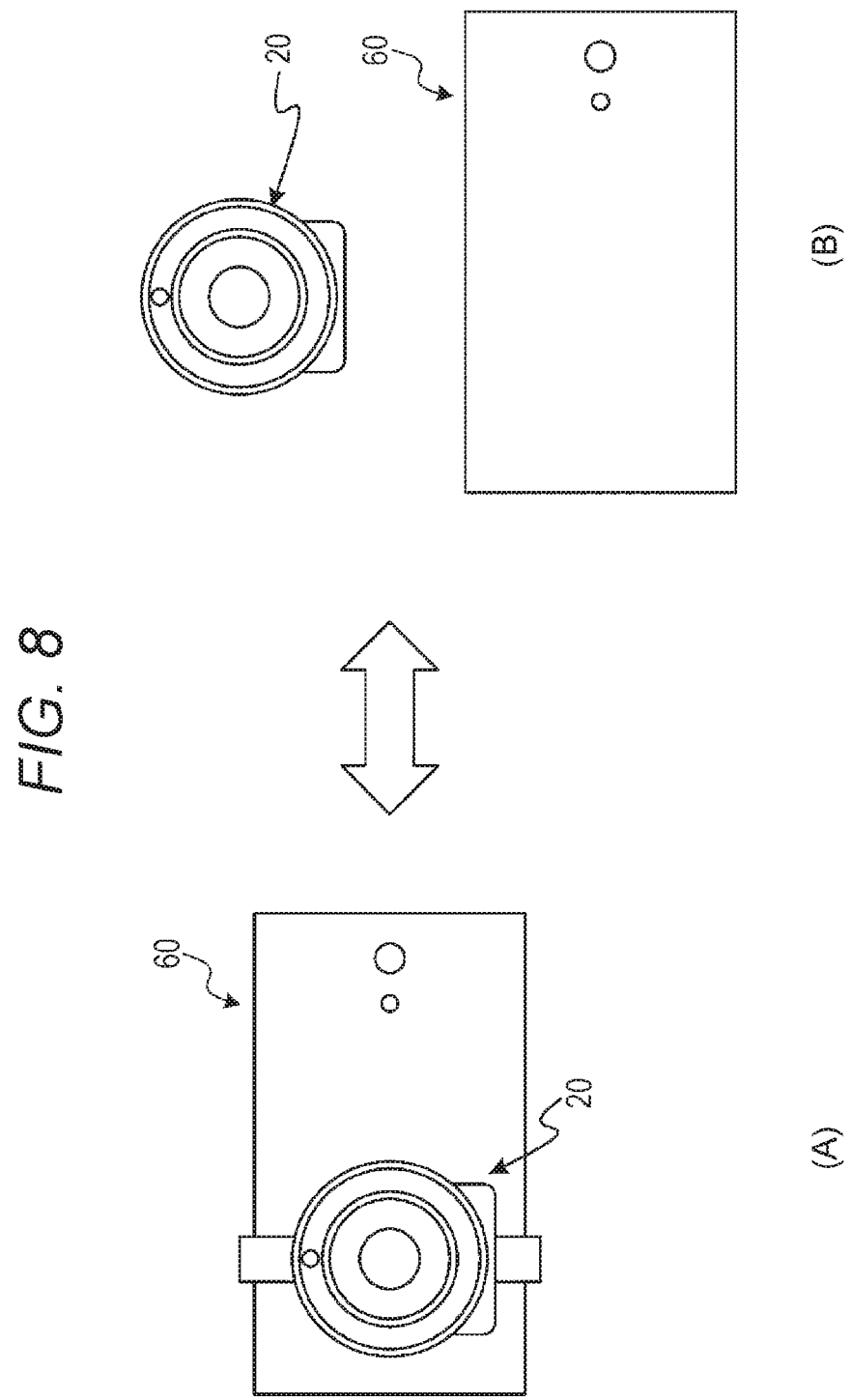
FIG. 8 is a view illustrating a fixed state and a separated state of the imaging device and the information processing device, respectively.

The attachment mechanism unit 50 described above allows use in a fixed state as one piece body as illustrated in of FIG. 8. The fixed state may be canceled to use the imaging device 20 and the information processing device 60 in a separate state as illustrated in (B) of FIG. 8. The imaging device 20 or the information processing device 60 thus constructed correlates disturbance information, which indicates disturbance affecting the imaging device 20 in the fixed state of the imaging device 20 and the information processing device 60, with image data generated by the imaging device 20 at the time of disturbance on the basis of fixation/separation information indicating the fixed state or the separated state after a link function is initiated.

Fixation/separation information indicating that the imaging device 20 and the information processing device 60 are in the fixed state or the separated state may be generated by the attachment mechanism unit 50, or may be generated by the imaging device 20 or the information processing device 60. For generating the fixation/separation information from the attachment mechanism unit 50, for example, each of the attachment members 51 and 52 may include a switch which is turned on when the attachment members 51 and 52 are fitted to the information processing device 60, and turned off when the attachment members 51 and 52 are not fitted to the information processing device 60. According to a structure including these switches, signals generated by the switches may be used the fixation/separation information. Moreover, in case of the attachment mechanism unit 50 separable from the imaging device 20, for example, the imaging device 20 may include a switch which is turned on when the attachment mechanism unit 50 is attached to the imaging device 20, and turned off when the attachment mechanism unit 50 is separated from the imaging device 20. According to a structure provided with this switch, signals generated by the switch become the fixation/separation information. Furthermore, for generating the fixation/separation information from the information processing device 60, for example, the information processing device 60 may be equipped with a detection mechanism for detecting whether or not the attachment members 51 and 52 are fitted to the information processing device 60, and use a detection result obtained by this detection mechanism as the fixation/separation information. Note that a switch may be provided on the information processing device 60 as the detection mechanism. The switch may be formed by utilizing the display panel 62. The fixed state or the separated state of the imaging device 20 and the information processing device 60 is determined in accordance with the fixation/separation information thus generated.

[5-3. Basic Operation of Imaging System]

Figure 9:
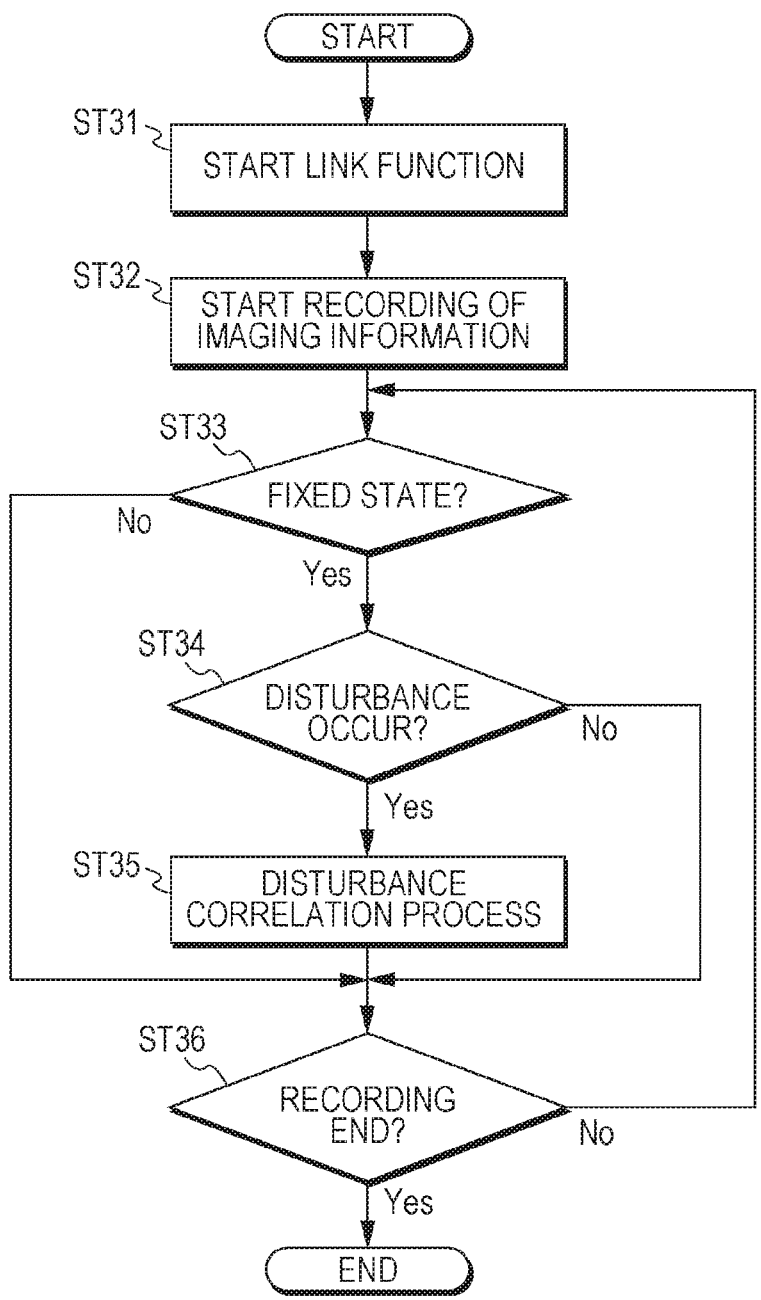
FIG. 9 is a flowchart showing a basic operation.

A basic operation of the imaging system is now described. The basic operation discussed herein is a case when disturbance has occurred in the imaging device during imaging. FIG. 9 is a flowchart showing the basic operation. In step ST31, the imaging system 10 starts the link function. The imaging system 10 performs the foregoing processes illustrated in FIG. 7, for example, to start the link function between the imaging device 20 and the information processing device 60, and proceeds to step ST32.

In step ST32, the imaging system 10 starts recording of imaging information. The imaging system 10 starts recording of image data showing still images or dynamic images, or recording of these image data and audio data in response to a user operation, for example, using the imaging device and proceeds to step ST33.

In step ST33, the imaging system 10 determines whether the current state is the fixed state. The imaging system 10 determines whether the imaging device and the information processing device are in the fixed state on the basis of fixation/separation information. The imaging system 10 proceeds to step ST34 when determining that the imaging device and the information processing device are in the fixed state, or proceeds to step ST36 when determining that the imaging device and the information processing device are in the separated state.

In step ST34, the imaging system 10 determines whether disturbance has occurred. The imaging system 10 proceeds to step ST35 when determining that disturbance has occurred, or proceeds to step ST36 when determining that no disturbance has occurred.

In step ST35, the imaging system 10 performs a disturbance correlation process. The imaging system 10 correlates disturbance information indicating disturbance with image data generated by the imaging device at the time of disturbance on the basis of fixation/separation information. Thereafter, the imaging system 10 proceeds to step ST36.

In step ST36, the imaging system 10 determines whether the current state is an end of recording. The imaging system 10 returns to step ST33 when determining that a recording end operation has not been performed, or ends the recording operation when determining that a recording end operation has been performed.

The imaging system performing the foregoing basic operation correlates disturbance information, which indicates disturbance affecting image data or audio data generated by the imaging device, with image data generated by the imaging device at the time of disturbance to easily detect a low-quality portion in a captured image on the basis of the disturbance information when fixation/separation information indicates the fixed state.

[5-4. First Operation of Imaging System]

A first operation of the imaging system is now described. The first operation discussed herein is an operation performed in response to occurrence of disturbance affecting quality of an image itself or a voice itself captured by the imaging device. The first operation presented herein by way of example is an operation in a dynamic image mode of the imaging device 20, assuming that the disturbance corresponds to a shift from the fixed state to the separated state, or from the separated state to the fixed state, for example.

Figure 10:
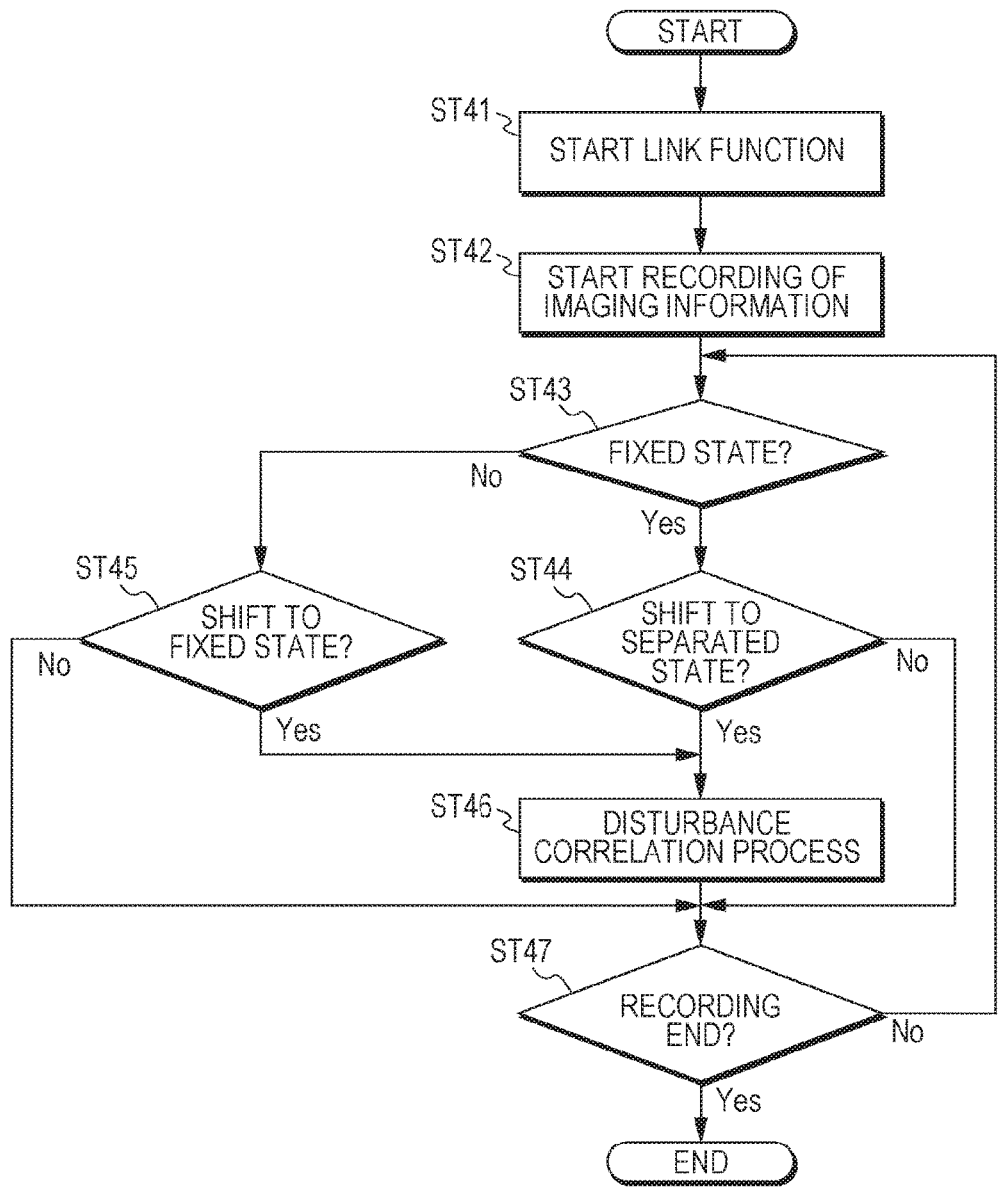
FIG. 10 is a flowchart showing a first basic operation.

FIG. 10 is a flowchart showing the first operation. In step ST41, the imaging system 10 starts the link function. The imaging system 10 starts the link function between the imaging device 20 and the information processing device 60 as described with reference to FIG. 7, and proceeds to step ST42.

In step ST42, the imaging system 10 starts recording of imaging information. The imaging device 20 of the imaging system 10 starts recording of image data showing dynamic images, or recording of these image data and audio data in response to the recording start operation, and proceeds to step ST43.

In step ST43, the imaging system 10 determines whether the current state is the fixed state. The imaging system 10 determines whether the imaging device 20 and the information processing device 60 are in the fixed state on the basis of fixation/separation information. The imaging system 10 proceeds to step ST44 when determining that the imaging device 20 and the information processing device 60 are in the fixed state, or proceeds to step ST45 when determining that the imaging device 20 and the information processing device 60 are in the separated state.

In step ST44, the imaging system 10 determines whether the current state has shifted to the separated state. The imaging system 10 proceeds to step ST46 when determining that the current state of the imaging device 20 and the information processing device 60 has shifted to the separated state, or proceeds to step ST47 when determining that the fixed state has been maintained.

In step ST45, the imaging system 10 determines whether the current state has shifted to the fixed state. The imaging system 10 proceeds to step ST46 when determining that the current state of the imaging device 20 and the information processing device 60 has shifted to the fixed state, or proceeds to step ST47 when determining that the separated state has been maintained.

In step ST46, the imaging system 10 performs a disturbance correlation process. The imaging system 10 correlates disturbance information indicating disturbance with image data generated by the imaging device at the time of disturbance on the basis of fixation/separation information, while regarding the shift from the fixed state to the separated state or the shift from the separated state to the fixed state as disturbance. Thereafter, the imaging system 10 proceeds to step ST47.

In step ST47, the imaging system 10 determines whether the current state is an end of recording. The imaging system 10 returns to step ST43 when determining that a recording end operation has not been performed, or ends the recording operation when determining that a recording end operation has been performed.

Determination of the shift from the fixed state to the separated state, or the shift from the separated state to the fixed state in the first operation may be made by either the imaging device or the information processing device. Note that the state shift corresponds to a shift from a certain stable state to a different stable state. When the imaging device 20 and the information processing device 60 are attached to each other into one piece body by the attachment mechanism unit 50 as illustrated in FIG. 3, for example, a state during operation of the attachment mechanism unit 50 for a shift from the fixed state to the separated state, or from the separated state to the fixed state may become unstable. Moreover, an operation of the attachment mechanism unit 50 for achieving a shift from the fixed state to the separated state, or from the separated state to the fixed state may affect image data or audio data generated by the imaging device. Accordingly, the state shift herein is defined as a shift from a certain stable state to a different stable state.

Furthermore, disturbance information may be correlated with image data by either the imaging device or the information processing device. When disturbance information is correlated with image data by the imaging device, the imaging device records disturbance information in a recording medium as auxiliary information together with image data, for example. When the state shift is determined by the information processing device in this situation, the information processing device notifies the imaging device about a determination result of the state shift via a wireless signal transmitted from the information processing device to the imaging device to correlate disturbance information with image data generated by the imaging device at the time of disturbance. Note that the information processing device records disturbance information in a recording medium as auxiliary information, for example, together with image data when disturbance information is correlated with image data by the information processing device. When the state shift is determined by the imaging device in this situation, the imaging device notifies the information processing device about a determination result of the state shift via a wireless signal transmitted from the imaging device to the information processing device to correlate disturbance information with image data generated by the imaging device at the time of disturbance. In addition, the method for correlating disturbance information with image data is not limited to the method of recording disturbance information together with image data in the recording medium in which image data is recorded, but may be a method of recording disturbance information in a recording medium different from the recording medium for image data. In addition, the device recording image data may be different from the device recording disturbance information. In this case, time information for the imaging device is equalized with time information for the information processing device. Image data is recorded by the imaging device together with time information, while disturbance information is recorded by the information processing device together with time information at the time of disturbance. This method allows recording of disturbance information at the time of disturbance in correlation with image data generated by the imaging device even when image data and disturbance information are recorded by different devices.

Note that the method for correlating disturbance information with image data is not limited to the foregoing method of recording disturbance information together with image data in the recording medium in which image data is recorded, and the foregoing method of recording disturbance information together with time information. For example, disturbance information and image data may be stored in an identical file to make a correlation between disturbance information and image data. Moreover, a correlation between disturbance information and image data may be made by using a unique identifier (such as unique material identifier (UMID) used as material identifier). Furthermore, disturbance information and image data stored in an identical folder, or unique identification information allocated to both disturbance information and image data may be registered in an external device via a network.

[5-5. Second Operation of Imaging System]

A second operation of the imaging system is now described. The second operation discussed herein is an operation performed in response to occurrence of disturbance affecting quality of an image itself or a voice itself captured by the imaging device. The second operation presented herein by way of example is an operation in a dynamic image mode of the imaging device, assuming that disturbance occurs in the information processing device. The information processing device gives notification to a user by using sound or vibration. In a state of use of a cellular phone function of the information processing device, for example, telephone call sound or a ringtone of an electronic mail is output from the information processing device. In addition, when the information processing device has a vibrator function vibrating the information processing device itself, a telephone call or a ringtone of an electronic mail is given through vibration of the information processing device itself. These call sound, ringtone, vibration of the information processing device itself become disturbance affecting image data or audio data generated by the imaging device.

Figure 11:
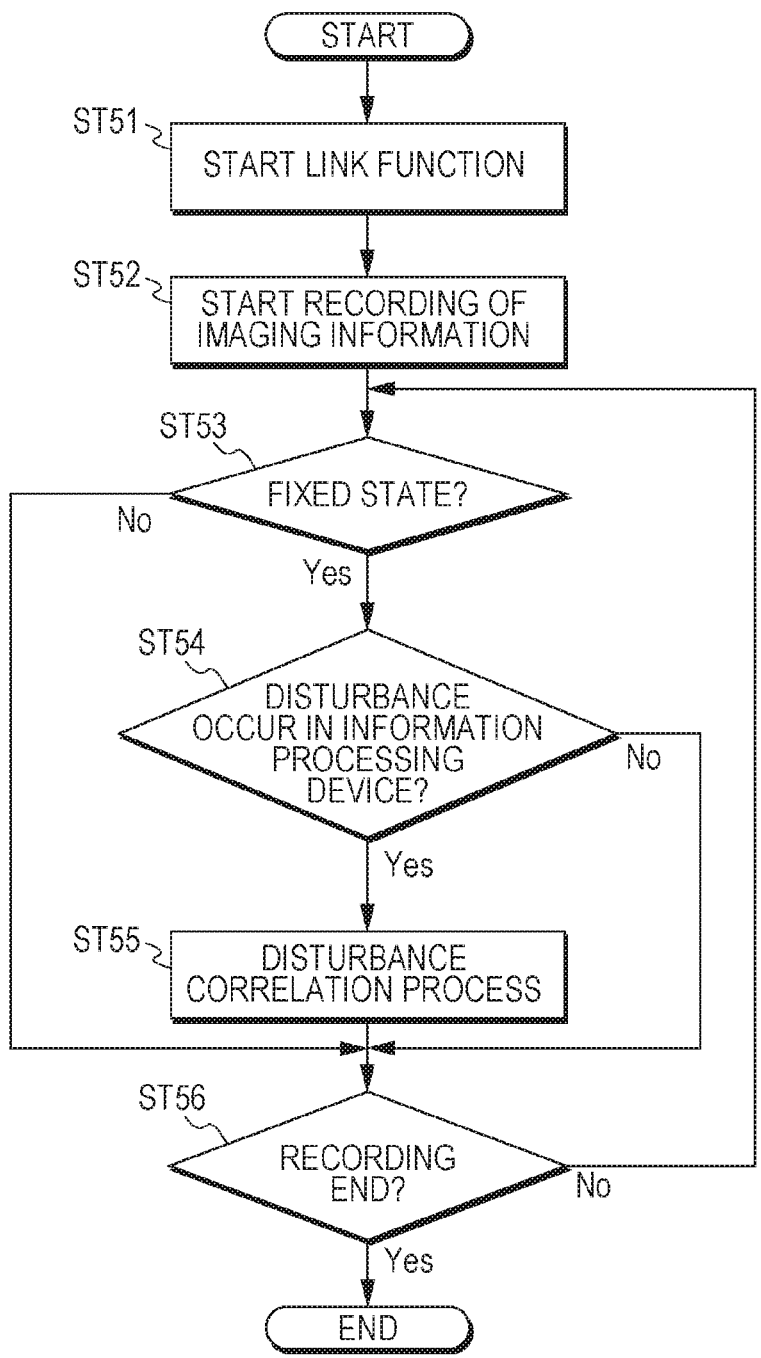
FIG. 11 is a flowchart showing a second basic operation.

FIG. 11 is a flowchart showing the second operation. In step ST51, the imaging system 10 starts the link function. The imaging system 10 starts the link function between the imaging device 20 and the information processing device 60 as described with reference to FIG. 7, and proceeds to step ST52.

In step ST52, the imaging system 10 starts recording of imaging information. The imaging device 20 of the imaging system 10 starts recording of image data showing dynamic images, or recording of the image data and audio data in response to the recording start operation, and proceeds to step ST53.

In step ST53, the imaging system 10 determines whether the current state is the fixed state. The imaging system 10 determines whether the imaging device 20 and the information processing device 60 are in the fixed state on the basis of fixation/separation information. The imaging system 10 proceeds to step ST54 when determining that the imaging device 20 and the information processing device 60 are in the fixed state, or proceeds to step ST56 when determining that the imaging device 20 and the information processing device 60 are in the separated state.

In step ST54, the imaging system 10 determines whether disturbance has occurred in the information processing device. When the information processing device gives notification to the user by using sound or vibration, the imaging system 10 determines that disturbance has occurred, and proceeds to step ST55. When no notification is given by using sound or vibration, the imaging system 10 determines that no disturbance occurs, and proceeds to step ST56.

In step ST55, the imaging system 10 performs a disturbance correlation process. The imaging system 10 correlates disturbance information, which indicates notification to the user using sound or vibration, with image data generated by the imaging device at the time of disturbance, and proceeds to step ST56.

In step ST56, the imaging system 10 determines whether the current state is an end of recording. The imaging system 10 returns to step ST53 when determining that a recording end operation has not been performed, or ends operating when determining that the recording end operation has been performed.

The fixed state may be determined by either the imaging device or the information processing device in the second operation. Furthermore, disturbance information may be correlated with image data by either the imaging device or the information processing device. When disturbance information is correlated with image data by the imaging device, for example, the imaging device records disturbance information in a recording medium as auxiliary information together with image data, for example. In this case, the information processing device transmits information, which indicates issue of notification to the user, to the imaging device as a wireless signal. In addition, when the fixed state is determined by the information processing device, a determination result showing the fixed state is transmitted to the imaging device as a wireless signal. In this case, the imaging device correlates disturbance information with image data generated by the imaging device at the time of disturbance in the fixed state of the imaging device and the information processing device, and records the disturbance information in a recording medium together with the image data. Note that the information processing device records disturbance information in a recording medium as auxiliary information, for example, together with image data when disturbance information is correlated with image data by the information processing device. When the fixed state is determined by the imaging device in this situation, a determination result showing the fixed state is transmitted to the information processing device as a wireless signal. In addition, time information such as a time of an internal clock and a time code is equalized between the imaging device and the information processing device similarly to the first operation. Furthermore, the determination result showing the fixed state is received by the device recording disturbance information. In this case, each of image data and disturbance information obtains identical time information, in which condition disturbance information is correlated with image data generated by the imaging device at the time of disturbance even in a state that image data and disturbance information are recorded by different devices.

Furthermore, disturbance information is not limited to information indicating only occurrence of disturbance, but may be information showing a type of disturbance for identification as well. For example, disturbance information may be information on the basis of which a type of disturbance affecting images (such as vibration at the time of reception of incoming call), or a type of disturbance affecting voices (such as ringtone and telephone call voice) is identifiable.

[5-6. Third Operation of Imaging System]

A third operation of the imaging system is now described. Discussed in the first and second operations are operations performed at the time of occurrence of disturbance affecting quality of an image itself or a voice itself captured by the imaging device. However, discussed in the third operation is an operation performed at the time of occurrence of disturbance affecting quality of images containing an image captured by the imaging device, or voices containing a voice captured by the imaging device.

The third operation presented herein by way of example is an operation in a dynamic image mode of the imaging device during a process for recording information acquired from the information processing device together with image data showing dynamic images, or during transmission of information, on the assumption that disturbance occurs in the information processing device. Information recorded with image data includes information acquired via communication lines, such as position information acquired by reception of position measurement signals or the like from a global positioning system, and messages obtained via a social networking service (SNS), for example. In addition, information transmitted via communication lines includes information about dynamic image recording, i.e., notification indicating that dynamic images are currently being recorded, imaging conditions and setting conditions of the imaging device, and information about imaging positions, for example. Disturbance occurring in the information processing device includes an interruption of a communication line used for reception or transmission of information from and to a communication network (base station of network) of a telephone system connected via the information processing device, for example. When the information processing device is located out of a communication range of a base station, information to be recorded with image data is difficult to receive via a communication line. As a result, disturbance occurs. In addition, when wireless communication between the imaging device and the information processing device becomes difficult, information acquired by the information processing device is difficult to record together with image data. As a result, disturbance occurs. Furthermore, when information indicating an imaging state or the like is exchanged between a plurality of users connected to each other via a network and capturing images in synchronization with each other, utilization of image data captured by other users with agreement of time is achievable during editing of image data. When communication lines with other users are interrupted, however, information indicating an imaging state or the like becomes unexchangeable. In this case, an editing process utilizing image data captured by other users is difficult to achieve. As a result, disturbance occurs.

According to the third operation, the operation shown in FIG. 11 is performed similarly to the second operation. Processing from step ST51 to step ST53 is executed in the third operation similarly to the second operation.

In addition, in step ST54 of the third operation, the imaging system 10 determines whether disturbance has occurred in the information processing device. When a communication line used for acquisition of information supplied to the imaging device is interrupted, the information processing device of the imaging system 10 determines that disturbance has occurred, and proceeds to ST55. When a communication line is not interrupted, the information processing device determines that no disturbance occurs, and proceeds to step ST56. Thereafter, processing from step ST55 to step ST56 is performed in the third operation similarly to the second operation.

The fixed state in the third operation may be determined by either the imaging device or the information processing device. Furthermore, disturbance information may be correlated with image data by either the imaging device or the information processing device. When the imaging device is configured to record disturbance information together with image data as auxiliary information for image data, for example, the imaging device performs a correlation process. In this case, the information processing device transmits information indicating an interruption of the communication line to the imaging device as a wireless signal. In addition, when the fixed state is determined by the information processing device, a determination result showing the fixed state is transmitted to the imaging device as a wireless signal. A correlation between disturbance information and image data generated by the imaging device at the time of disturbance is thus realizable in the fixed state of the imaging device and the information processing device. In addition, when the information processing device is configured to record disturbance information together with image data as auxiliary information for image data, the information processing device performs a correlation process. When the fixed state is determined by the imaging device in this situation, a determination result showing the fixed state is transmitted to the information processing device as a wireless signal. A correlation between disturbance information and image data generated by the imaging device at the time of disturbance is thus realizable in the fixed state of the imaging device and the information processing device. In addition, the device recording disturbance information receives a determination result showing the fixed state in a condition of agreement between time of the imaging device and time of the information processing device similarly to the first operation. In this case, a correlation between disturbance information and image data generated by the imaging device at the time of disturbance is realizable in the fixed state of the imaging device and the information processing device even when image data and disturbance information are recorded by different devices.

[5-7. Other Operations of Imaging System]

While discussed in the first through third operations are operations performed when image data and audio data showing dynamic images are recorded. However, a correlation between disturbance information and image data generated by the imaging device at the time of disturbance may be made when image data showing still images are recorded by the imaging device. For example, a correlation of disturbance information may be made for storing audio data by the imaging device together with image data showing still images. In this case, whether or not audio data has been possibly affected by disturbance is determined on the basis of the presence or absence of a correlation between the image data and the disturbance information. In addition, a correlation of disturbance information may be made for continuously storing image data showing still images by the imaging device. In this case, still images possibly affected in a plurality of continuous recorded still images are determined on the basis of the correlation. In addition, recording of image data herein is not limited to recording by a user operation input to the imaging device, but may be recording automatically performed in accordance with a condition of a subject identified by subject identification for a captured image, such as a facial expression of a subject.

In addition, disturbance information may be correlated with image data generated by the imaging device at the time of disturbance even in the separated state of the imaging device and the information processing device when disturbance affects audio data generated together with image data by the imaging device. For example, when the imaging device is located close to the information device, a ringtone given to the user as notification by the information processing device is recorded by the imaging device even in the separated state of the imaging device and the information processing device. Accordingly, in case of disturbance information affecting audio data, image data and audio data at the time of the ringtone corresponding to disturbance are determined on the basis of the disturbance information correlated with the image data generated by the imaging device at the time of disturbance.

On the other hand, a ringtone from the information processing device is not recorded by the imaging device when the imaging device and the information processing device are located far from each other. Accordingly, even in the separated state of the imaging device and the information processing device, disturbance information is correlated with image data generated by the imaging device at the time of disturbance when a separation distance between the imaging device and the information processing device is shorter than a predetermined distance. This method eliminates an unnecessary correlation between image data and disturbance not affecting image data and audio data. Note that the separation distance between the imaging device and the information processing device may be measured on the basis of signal intensity in wireless communication between the imaging device and the information processing device, or by the use of a distance measurement sensor utilizing ultrasonic waves, light and the like.

Note that the imaging device 20 may be configured not to generate audio data, but to generate only image data, unlike the imaging device 20 generating both image data and audio data in the example described above.

<6. Use of Disturbance Information>

Use of disturbance information correlated with image data is now described. For editing or processing image data and audio data, for example, image data and audio data at the time of disturbance are determined on the basis of disturbance information correlated with image data or the like. When there is a possibility that disturbance affects image data and audio data, image data and audio data in a predetermined time range with respect to the time of disturbance are deleted as unnecessary data, for example.

FIG. 12 illustrates examples of deletion of image data and audio data. (A) of FIG. 12 illustrates an example of disturbance corresponding to a shift from the fixed state to the separated state. It is assumed that disturbance occurs by separation of the imaging device and the information processing device at a time ta, for example, in correspondence with fixation/separation. information. In this case, disturbance information is correlated with image data at the time ta. In addition, disturbance information indicates a shift from the fixed state to the separated state. For deleting image data (audio data) affected by disturbance, a deletion target is set to a predetermined time range TW with respect to the position with which disturbance information is correlated. Here, in case of an operation of a shift from the fixed state to the separated state of the imaging device and the information processing device, a typical time TS from a start of the operation to indication of the separated state by fixation/separation information, and a typical time TE from indication of the separated state by the fixation/separation information to an operation end are determined beforehand. Moreover, the predetermined time range TW is defined as a range constituted by a time range from the time ta to a time TS in a past direction, and a time range from the time ta to a time TE in a future direction. This method achieves, on the basis of the disturbance information, deletion of image data and audio data during a period of an operation of a state shift from the fixed state to the separated state.

(B) of FIG. 12 illustrates an example of a case when disturbance (such as incoming call notification to the user) occurs in the information processing device. It is assumed that the information processing device starts incoming call notification to the user at a time tbs, and ends the notification at a time tbe, for example. In this case, disturbance information is correlated with image data in a period from the time tbs to the time tbe. In addition, disturbance information indicates that the disturbance corresponds to a start of incoming call notification, or an end of incoming call notification. For deletion of image data (audio data) affected by the disturbance, image data is deleted in a time range which may be affected by the disturbance, i.e., the time range TW from the time tbs corresponding to the start of the incoming call notification to the time tbe corresponding to the end of the incoming call notification. This method achieved deletion of image data and audio data during the period of the incoming call notification on the basis of the disturbance information. In addition, deletion of the image data and the audio data during the period from the start of the incoming call notification to an end of telephone communication is achievable on the basis of the disturbance information when the time tbe is set to the end of telephone communication.

Moreover, for creating digest content by an editing process, creation of digest content excluding image data and audio data in a predetermined time range with respect to a position correlated with disturbance information is achievable. This method allows creation of digest content free of effects of disturbance.

Furthermore, effects of disturbance are easily recognizable when image data and audio data are extracted from a predetermined time range with respect to a position to which disturbance information is correlated.

Also, for rating a grade of a recorded image, rating may be determined with reference to whether or not a rating target position corresponds to a position to which disturbance information is correlated. In this case, automatic processing for a position which may be affected by disturbance is achievable as a low-quality position, for example. In addition, images may be automatically classified into a group not affected by disturbance, and a group possibly affected by disturbance on the basis of disturbance information. In this case, images are classified into more detailed groups when disturbance information indicates types of disturbance. For example, images may be automatically classified into a group where only image data is affected, a group where only audio data is affected, and a group both image data and audio data are affected, for example.

Furthermore, voices in a predetermined time range with respect to a position to which disturbance information is correlated may be automatically muted to easily perform a process for eliminating unnecessary voices, for example.

A series of processes described in the specification may be executed by hardware, software, or a complex configuration of hardware and software. For executing the processes by software, programs recording process sequences are installed in a memory incorporated in dedicated hardware within a computer to be executed by the computer. Alternatively, the programs are installed in a general-purpose computer capable of executing various types of processes to be executed by the general-purpose computer.

For example, the programs may be recorded in a hard disk, a solid state drive (SSD), or a read only memory (ROM) as a recording medium beforehand. Alternatively, the programs may be temporarily or permanently stored (recorded) in a flexible disk, a compact disc read only memory (CD-ROM), magneto optical (MO) disc, a digital versatile disc (DVD), a blu-ray disc (BD) (registered trademark), a magnetic disk, a semiconductor memory card, or other removable recording media. These removable recording media may be provided as so-called package software.

In addition, the programs may be installed in a computer not only from a removable recording medium, but also via wireless or wired transfer to a computer through a network such as a local area network (LAN) and the Internet from a download site. A computer having received the programs transferred in this manner installs the programs in a recording medium such as a built-in hard disk.

Note that effects to be offered are not limited to the effects described in the present specification presented only by way of example, but may include additional effects not described herein. Furthermore, it is not intended that the present technology be interpreted with limitations to the foregoing embodiment of the technology. The embodiment of this technology disclosed herein is presented only by way of example of the present technology. It is obvious that those skilled in the art may add corrections or substitutions to the embodiment without departing from the subject matters of the present technology. Accordingly, the subject matters of the present technology should be understood only on the basis of the appended claims.

In addition, the imaging system according to the present technology may have the following configurations.

(1) An imaging system including a fixed state in which an information processing device and an imaging device are fixed to each other, and a separated state in which the information processing device and the imaging device are separated from each other, the imaging system including a control unit that correlates disturbance information, which indicates disturbance affecting image data or audio data generated by the imaging device, with image data generated by the imaging device at the time of the disturbance on the basis of fixation/separation information indicating the fixed state or the separated state.

(2) The imaging system according to (1), wherein the control unit correlates the disturbance information with the image data when the fixation/separation information indicates the fixed state.

(3) The imaging system according to (2), wherein the control unit correlates the disturbance information with the image data when the fixation/separation information indicates the separated state in a condition that a distance between the information processing device and the imaging device is shorter than a predetermined distance.

(4) The imaging system according to any one of (1) through (3), further including a fixation/separation determination unit that determines the fixed state or the separated state, and generates the fixation/separation information.

(5) The imaging system according to any one of (1) through (4), wherein the disturbance information indicates disturbance affecting quality of an image itself or a voice itself captured by the imaging device.

(6) The imaging system according to any one of (1) through (5), wherein the disturbance information includes information indicating a shift from the fixed state to the separated state, or a shift from the separated state to the fixed state.

(7) The imaging system according to any one of (1) through. (6), wherein the disturbance information includes information indicating notification given to a user from the information processing device.

(8) The imaging system according to (7), wherein
the information processing device has a cellular phone function, and
the information indicating the notification given to the user from the information processing device includes information indicating notification concerning the cellular phone function.

(9) The imaging system according to (7) or (8), wherein the notification given to the user is notification utilizing sound or vibration.

(10) The imaging system according to any one of (1) through (9), wherein the disturbance information indicates disturbance affecting quality of images containing an image captured by the imaging device, or quality of voices containing a voice captured by the imaging device.

(11) The imaging system according to any one of (1) through (10), wherein
the information processing device includes a communication terminal function, and
the disturbance information is information indicating an interruption of a communication line used for the communication terminal function of the information processing device.

(12) The imaging system according to any one of (1) through (11), wherein
the control unit is provided on the imaging device, and
the information processing device notifies the imaging device about disturbance occurring in the information processing device.

(13) The imaging system according to any one of (1) through (12), wherein the disturbance information includes information indicating a type of disturbance.

(14) The imaging system according to any one of (1) through (13), wherein the imaging device generates the image data, or the image data and audio data.

INDUSTRIAL APPLICABILITY

According to an imaging system, an imaging device, an information processing device, a method, and a program of this technology, there are provided a fixed state in which the information processing device and the imaging device are fixed to each other, and a separated state in which the information processing device and the imaging device are separated from each other. Disturbance information, which indicates disturbance affecting image data or audio data generated by the imaging device, is correlated with image data generated by the imaging device at the time of the disturbance on the basis of fixation/separation information indicating the fixed state or the separated state. Accordingly, a low-quality portion in a captured image is easily detectable in a system configured for use in a fixed state of an imaging device and an information processing device fixed to each other, as well as a separated state of being separated from each other. Accordingly, this technology is applicable to an imaging system configured to include an imaging device not having a display function in a state of being fixed to or separated from an information processing device such as a smartphone, and allow an information processing device side check of a captured image generated by the imaging device, for example, via communication between the imaging device and the information processing device.

REFERENCE SIGNS LIST

Imaging system
15, 45, 85, 95 Control unit
20 Imaging device
21 Outer cylindrical unit
22 Control ring
31 Imaging optical system
32 imaging unit
33 Image processing unit
34, 75 Recording/reproducing unit
35, 78 Power supply unit
36, 76 Sensor unit
37, 77 Storage unit
38, 81 Display unit
39 Audio input unit
41, 71 Communication unit
42, 74 Illumination unit
44, 82 Operation input unit
46, 86 Recording medium
50 Attachment mechanism unit
51, 52 Attachment member
60 Information processing device
61 Outer housing
62 Display panel
72 Audio input/output unit
73 Imaging block
78 Power supply unit
83 Vibration generation mechanism
91 Fixation/separation determination unit
411 First wireless communication unit
412 First antenna
413 Second wireless communication unit
414 Second antenna
441 Zoom button
442 Shutter button
711 First wireless communication unit
712 First antenna
713 Second wireless communication unit
714 Second antenna 715 Third wireless communication unit
716 Third antenna

The invention claimed is:

1. An imaging system including a fixed state in which an information processing device and an imaging device are fixed to each other, and a separated state in which the information processing device and the imaging device are separated from each other,
the imaging system comprising a memory configured to record a disturbance information and a control unit configured to correlate the disturbance information with an image data generated by the imaging device on the basis of fixation/separation information indicating the fixed state or the separated state, wherein
the disturbance information indicates a disturbance that affects the image data or an audio data generated by the imaging device, and
the correlating includes correlating a time position in the disturbance information with a corresponding time position in the image data.

2. The imaging system according to claim 1, wherein the control unit is configured to correlate the disturbance information with the image data in the case where the fixation/separation information indicates the fixed state.

3. The imaging system according to claim 2, wherein the control unit is configured to correlate the disturbance information with the image data in the case where the fixation/separation information indicates the separated state in a condition that a distance between the information processing device and the imaging device is shorter than a predetermined distance.

4. The imaging system according to claim 1, further comprising a fixation/separation determination unit configured to determine the fixed state or the separated state, and to generate the fixation/separation information.

5. The imaging system according to claim 1, wherein the disturbance information indicates an effect on quality of an image itself or a voice itself captured by the imaging device.

6. The imaging system according to claim 5, wherein the disturbance information includes information indicating a shift from the fixed state to the separated state, or a shift from the separated state to the fixed state.

7. The imaging system according to claim 5, wherein the disturbance information includes information indicating a notification given to a user from the information processing device.

8. The imaging system according to claim 7, wherein
the information processing device has a cellular phone function, and
the notification includes information concerning the cellular phone function.

9. The imaging system according to claim 7, wherein the notification given to the user utilizes sound or vibration.

10. The imaging system according to claim 1, wherein the disturbance information indicates a disturbance affecting quality of the image data containing an image captured by the imaging device, or the audio data containing a voice captured by the imaging device.

11. The imaging system according to claim 10, wherein
the information processing device includes a communication terminal function, and
the disturbance information is information indicating an interruption of a communication line used for the communication terminal function of the information processing device.

12. The imaging system according to claim 1, wherein the control unit is provided on the imaging device, and the information processing device notifies the imaging device about a disturbance occurring in the information processing device.

13. The imaging system according to claim 1, wherein the disturbance information includes information indicating a type of disturbance.

14. The imaging system according to claim 1, wherein the imaging device generates the image data, or the image data and audio data.

15. An imaging control method that includes a fixed state in which an information processing device and an imaging device are fixed to each other, and a separated state in which the information processing device and the imaging device are separated from each other,
the method comprising the steps of:
recording a disturbance information, and
correlating the disturbance information with an image data generated by the imaging device on the basis of fixation/separation information indicating the fixed state or the separated state, wherein
the disturbance information indicates a disturbance that affects the image data or an audio data generated by the imaging device, and
the correlating includes correlating a time position in the disturbance information with a corresponding time position in the image data.

16. A non-transitory computer readable medium storing program code for causing a computer to execute control for an information processing device or an imaging device including a fixed state in which the information processing device and the imaging device are fixed to each other, and a separated state in which the information processing device and the imaging device are separated from each other,
the program code configured for causing the computer to execute a procedure that:
records a disturbance information, and
correlates the disturbance information with an image data generated by the imaging device on the basis of fixation/separation information indicating the fixed state or the separated state, wherein
the disturbance information indicates a disturbance that affects the image data or an audio data generated by the imaging device, and
the correlating includes correlating a time position in the disturbance information with a corresponding time position in the image data.

17. An imaging device including a fixed state of being fixed to an information processing device, and a separated state of being separated from the information processing device,
the imaging device comprising a memory configured to record a disturbance information and a control unit configured to correlate the disturbance information with an image data generated by the imaging device on the basis of fixation/separation information indicating the fixed state or the separated state, wherein
the disturbance information indicates a disturbance that affects the image data or an audio data generated by the imaging device, and
the correlating includes correlating a time position in the disturbance information with a corresponding time position in the image data.

18. An information processing device including a fixed state of being fixed to an imaging device, and a separated state of being separated from the imaging device,
the information processing device comprising a memory configured to record a disturbance information and a control unit configured to correlate the disturbance information with an image data generated by the imaging device on the basis of fixation/separation information indicating the fixed state or the separated state, wherein the disturbance information indicates a disturbance that affects the image data or an audio data generated by the imaging device, and the correlating includes correlating a time position in the disturbance information with a corresponding time position in the image data.

* * * * *